US011001394B2

(12) United States Patent
Yin et al.

(10) Patent No.: US 11,001,394 B2
(45) Date of Patent: May 11, 2021

(54) GIMBAL AND UNMANNED AERIAL VEHICLE PROVIDED WITH GIMBAL

(71) Applicant: SZ DJI OSMO TECHNOLOGY CO., LTD., Shenzhen (CN)

(72) Inventors: Chengyu Yin, Shenzhen (CN); Zihan Chen, Shenzhen (CN); Yongze Qi, Shenzhen (CN)

(73) Assignee: SZ DJI OSMO TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/750,464

(22) Filed: Jan. 23, 2020

(65) Prior Publication Data

US 2020/0156806 A1 May 21, 2020

Related U.S. Application Data

(63) Continuation of application No. PCT/CN2017/100026, filed on Aug. 31, 2017.

(51) Int. Cl.

*B64D 47/08* (2006.01)
*F16M 11/12* (2006.01)
*G03B 15/00* (2021.01)
*G03B 17/56* (2021.01)

(52) U.S. Cl.

CPC .......... *B64D 47/08* (2013.01); *F16M 11/123* (2013.01); *G03B 15/006* (2013.01); *B64C 2201/127* (2013.01); *G03B 17/561* (2013.01)

(58) Field of Classification Search

None

See application file for complete search history.

(56) References Cited

U.S. PATENT DOCUMENTS

| | | | | |
|---|---|---|---|---|
| 9,280,038 | B1 * | 3/2016 | Pan | F16M 11/041 |
| 2010/0032876 | A1 * | 2/2010 | Hiley | F16F 15/02 267/140.5 |
| 2013/0105619 | A1 | 5/2013 | Buscher et al. | |
| 2015/0097950 | A1 | 4/2015 | Wang et al. | |
| 2017/0171468 | A1 | 6/2017 | Wang et al. | |
| 2018/0115716 | A1 * | 4/2018 | Gubler | B64D 47/08 |
| 2018/0302548 | A1 * | 10/2018 | Bao | H04N 5/2251 |
| 2019/0011077 | A1 * | 1/2019 | Chen | B64D 47/08 |

(Continued)

FOREIGN PATENT DOCUMENTS

| | | | |
|---|---|---|---|
| CN | 204674844 | U | 9/2015 |
| CN | 105173100 | A | 12/2015 |
| CN | 205327435 | U | 6/2016 |

(Continued)

OTHER PUBLICATIONS

The World Intellectual Property Organization (WIPO) International Search Report for PCT/CN2017/100026 dated Jan. 31, 2018 5 pages.

*Primary Examiner* — William B Perkey

(74) *Attorney, Agent, or Firm* — Anova Law Group, PLLC

(57) ABSTRACT

A gimbal includes a photographing device, a support assembly carrying the photographing device, a connection assembly connected to the support assembly, and a plurality of shock absorption balls mounted at the connection assembly and configured to connect the gimbal to a vehicle body of an unmanned aerial vehicle (UAV). A geometric plane where geometric centers of the plurality of shock absorption balls are located is oblique relative to a horizontal direction.

19 Claims, 10 Drawing Sheets

90
94
92
92
S
93
91

(56) References Cited

U.S. PATENT DOCUMENTS

| | | | | |
|---|---|---|---|---|
| 2019/0155130 | A1* | 5/2019 | Liao | F16M 11/2064 |
| 2020/0156806 | A1* | 5/2020 | Yin | F16M 11/123 |

FOREIGN PATENT DOCUMENTS

| | | | |
|---|---|---|---|
| CN | 205707402 | U | 11/2016 |
| CN | 206050094 | U | 3/2017 |
| CN | 206093429 | U | 4/2017 |
| CN | 107108044 | A | 8/2017 |
| CN | 206407151 | U | 8/2017 |
| JP | 2017122506 | A | 7/2017 |
| KR | 20170072673 | A | 6/2017 |
| WO | 2017128061 | A1 | 8/2017 |

* cited by examiner

GIMBAL AND UNMANNED AERIAL VEHICLE PROVIDED WITH GIMBAL

CROSS-REFERENCE TO RELATED APPLICATION

This application is a continuation of International Application No. PCT/CN2017/100026, filed Aug. 31, 2017, the entire content of which is incorporated herein by reference.

TECHNICAL FIELD

The present disclosure relates to a gimbal and an unmanned aerial vehicle (UAV) having the gimbal.

BACKGROUND

A UAV usually includes a stabilizing gimbal for carrying a photographing device. A common way to reduce vibration of the stabilizing gimbal is to use shock absorption balls above the gimbal to isolate vibration, which can be effective for high-frequency vibration attenuation.

However, since the center of gravity of the mounted gimbal is far from the centroid of the layout of the shock absorption balls, the translational vibration while the UAV moves horizontally will cause the gimbal to rotate around the center of gravity and generate vibration coupling, which brings a lot of external interference, and has a serious adverse effect on the control effect of the gimbal.

SUMMARY

In accordance with the disclosure, there is provided a gimbal including a photographing device, a support assembly carrying the photographing device, a connection assembly connected to the support assembly, and a plurality of shock absorption balls mounted at the connection assembly and configured to connect the gimbal to a vehicle body of an unmanned aerial vehicle (UAV). A geometric plane where geometric centers of the plurality of shock absorption balls are located is oblique relative to a horizontal direction.

Also in accordance with the disclosure, there is provided a vehicle body and a gimbal connected to the vehicle body. The gimbal includes a photographing device, a support assembly carrying the photographing device, a connection assembly connected to the support assembly, and a plurality of shock absorption balls mounted at the connection assembly and configured to connect the gimbal to a vehicle body of an unmanned aerial vehicle (UAV). A geometric plane where geometric centers of the plurality of shock absorption balls are located is oblique relative to a horizontal direction. The vehicle body includes a mounting assembly, and the connection assembly is mounted at the mounting assembly.

BRIEF DESCRIPTION OF THE DRAWINGS

To more clearly illustrate the technical solution of the present disclosure, the accompanying drawings used in the description of the disclosed embodiments are briefly described below. The drawings described below are merely some embodiments of the present disclosure. Other drawings may be derived from such drawings by a person with ordinary skill in the art without creative efforts.

DETAILED DESCRIPTION OF THE EMBODIMENTS

The technical solutions in the example embodiments of the present disclosure will be described with reference to the accompanying drawings. The described embodiments are only some of the embodiments of the present disclosure, rather than all the embodiments. Based on the embodiments of the present disclosure, all other embodiments obtained by a person of ordinary skill in the art without creative efforts shall fall within the scope of the present disclosure.

Example embodiments will be described with the reference to the accompanying drawings, in which the same numbers refer to the same or similar elements unless otherwise specified. The implementations described in the following example embodiments do not represent all implementations consistent with the present disclosure. Rather, they are merely examples of devices and methods consistent with some aspects of the invention as detailed in the appended claims.

The terminology used in the present disclosure is for the purpose of describing particular embodiments only, and is not to limit the present disclosure. The singular forms “a,” “said,” and “the” as used in this disclosure include the plural forms, unless the context clearly indicates otherwise. The term “and/or” refers to any or all possible combinations of one or more of the associated items.

Figure 1:
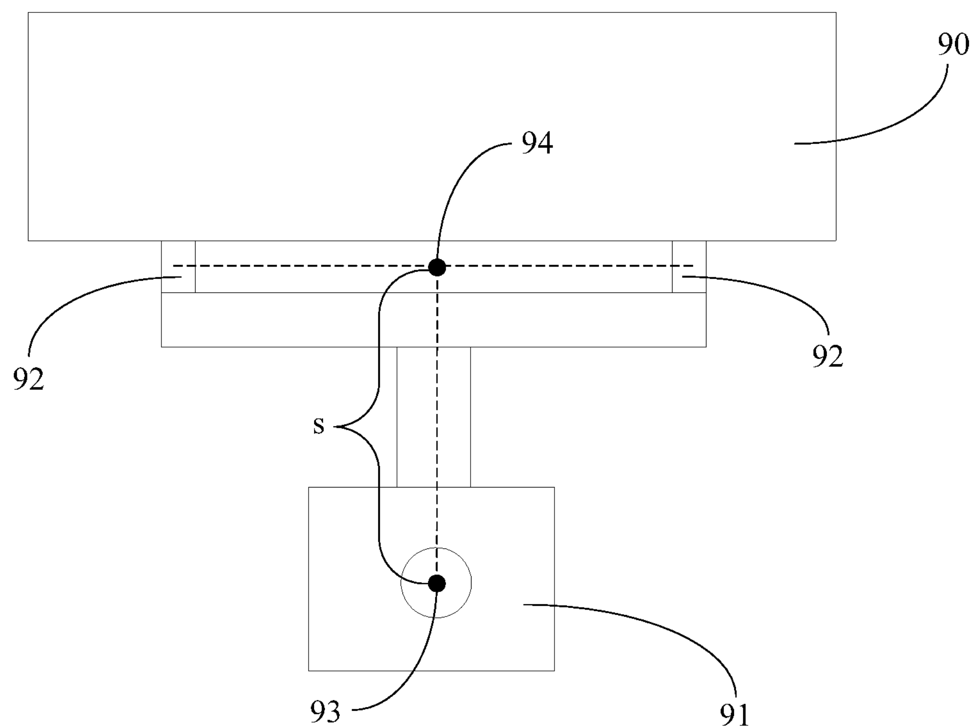
FIG. 1 is a schematic structural diagram of an existing UAV.

FIG. 1 is a schematic structural diagram of an existing UAV. The UAV includes a vehicle body 90, a gimbal 91, and a plurality of shock absorption balls 92 arranged between the gimbal 91 and the vehicle body 90. Since the center of gravity 93 of the mounted gimbal 91 is located below the centroid 94 of the geometric shape formed by the plurality of shock absorption balls 92, and the distance s between the two is relatively long, the translational vibration while UAV moves horizontally will cause the gimbal 91 to rotate around the center of gravity and generate vibration coupling, which brings a lot of external interference, and has a serious adverse effect on the control effect of the gimbal 91.

The present disclosure provides a gimbal and a UAV having the gimbal to solve the problem. The gimbal and the UAV having the gimbal will be described in detail below with reference to the drawings. When there is no conflict, the following embodiments and features in the embodiments can be combined with each other.

Figure 2:
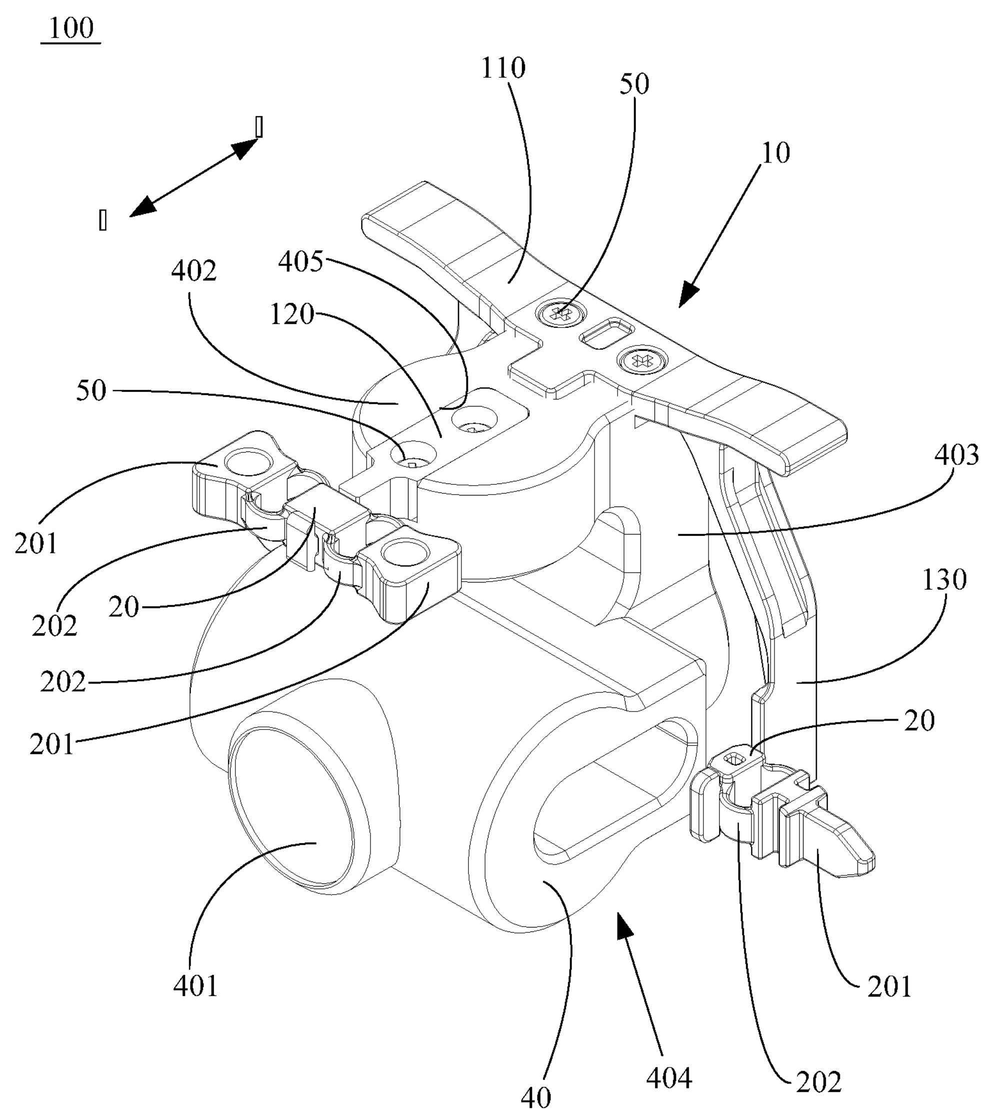
FIG. 2 is a schematic perspective view of a gimbal according to an embodiment of the disclosure.
Figure 3:
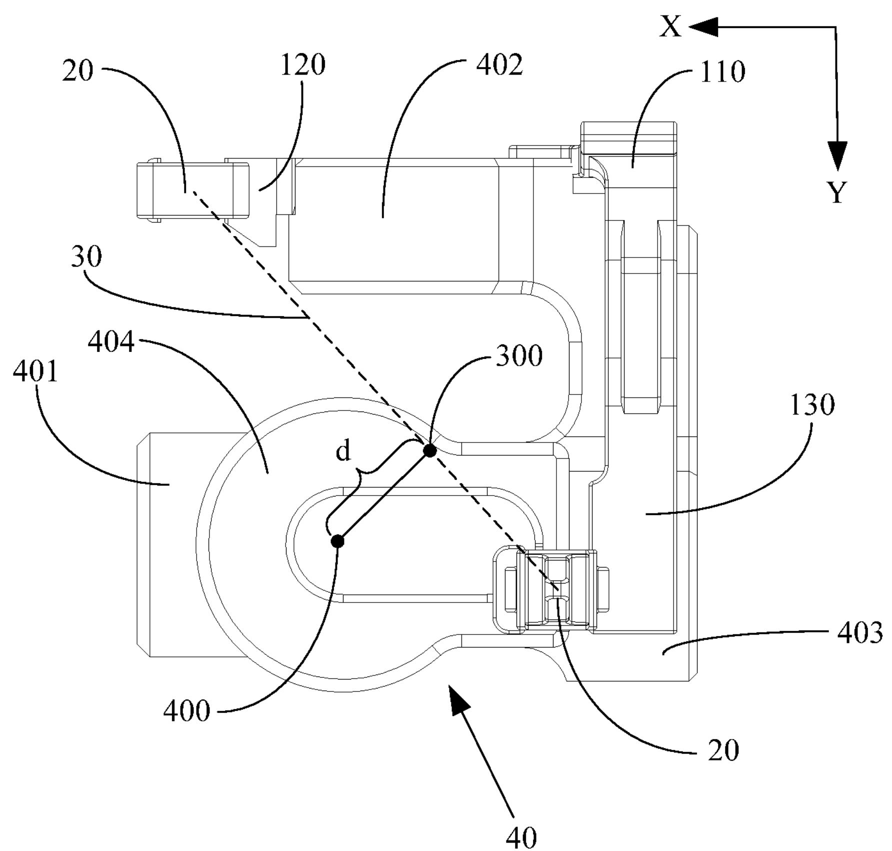
FIG. 3 is a side view of the gimbal shown in FIG. 2.
Figure 4:
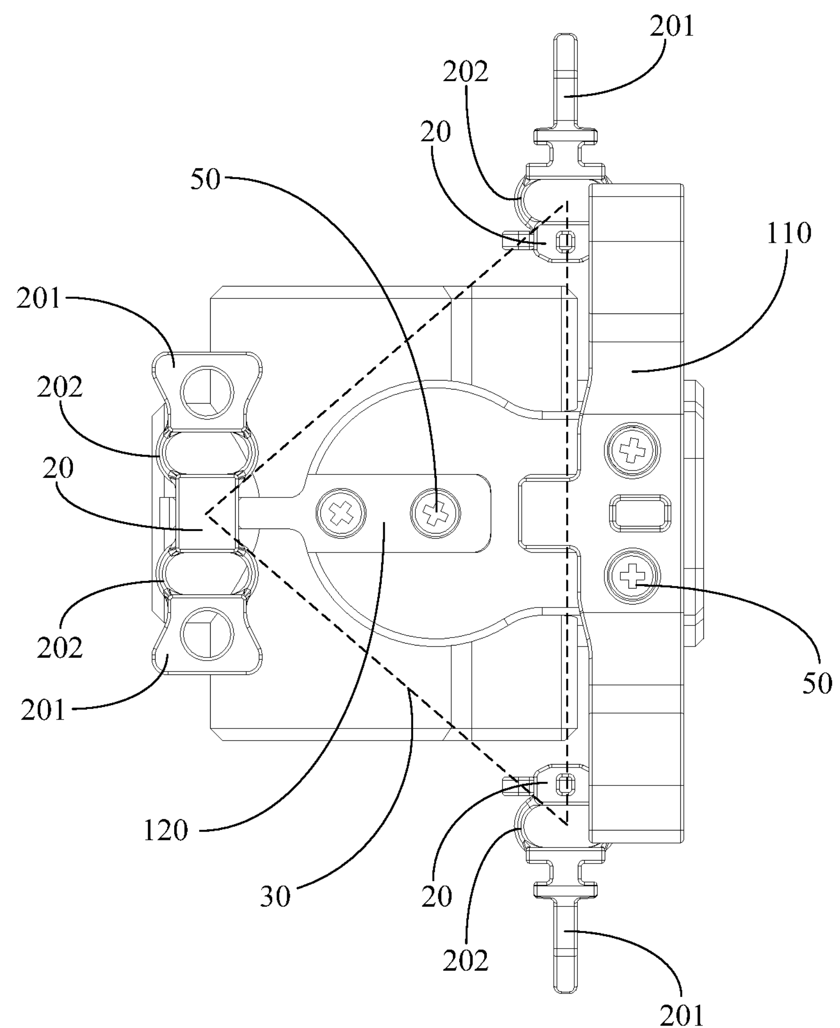
FIG. 4 is a top view of the gimbal shown in FIG. 2.

As shown in FIGS. 2 to 4, a gimbal 100 according to an embodiment of the present disclosure includes a photographing device 401, a support assembly 40 for carrying the photographing device 401, a connection assembly 10 connected to the support assembly 40, and multiple shock absorption balls 20 mounted at the connection assembly 10. The gimbal 100 is connected to the UAV (not shown in the figures) through the shock absorption balls 20. In some embodiments, the shock absorption balls 20 are made of soft material such as silica gel, rubber, which can effectively attenuate high-frequency vibrations.

A geometric plane where the geometric centers of the multiple shock absorption balls 20 are located is oblique relative to a horizontal direction, so that the centroid 300 of a geometric shape 30 (geometric center of the geometric shape 30) formed by the geometric centers of the multiple shock absorption balls 20 is close to the center of gravity 400 of the gimbal 100 or coincides with the center of gravity 400 of the gimbal 100. Therefore, the distance between the centroid 300 of a geometric shape 30 formed by the geometric centers of the multiple shock absorption balls 20 and the center of gravity 400 of the gimbal 100 is reduced. Accordingly, rotational vibrations of the gimbal 100 around the center of gravity 400 caused by the vibrations of the UAV in a translational direction are reduced and the vibration isolation effect of the shock absorption balls 20 is improved. Further, the shake of the gimbal 100 caused by the shaking of the UAV can be reduced to avoid the collisions between the gimbal 100 and other structural members of the UAV, thereby improving the stabilization-enhancement control effect on the gimbal 100.

Figure 5:
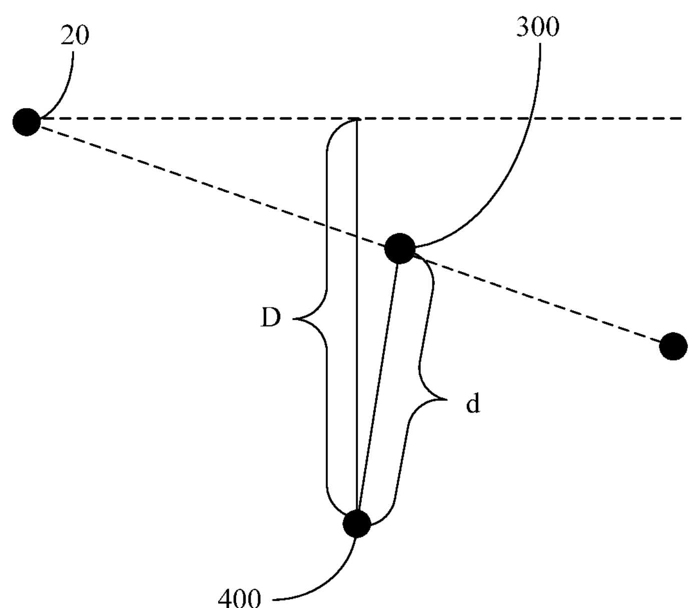
FIGS. 5 and 6 are layout diagrams of shock absorption balls of the gimbal according to an embodiment of the disclosure.
Figure 6:
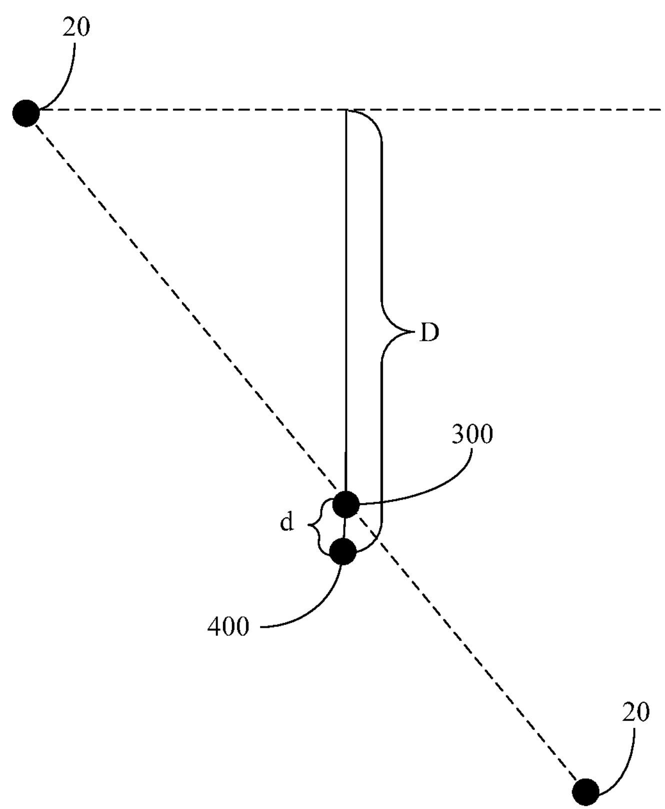

As shown in FIGS. 5 and 6, a geometric plane where the geometric centers of the multiple shock absorption balls 20 are located is oblique relative to a horizontal direction, and the distance between the centroid 300 of the geometric shape 30 formed by the geometric centers of the multiple shock absorption balls 20 and the center of gravity 400 of the gimbal 100 *d* is smaller than a maximum distance D, where the maximum distance D is the maximum value of the distances between the center of gravity 400 of the gimbal 100 and the horizontal planes where the geometric centers of the multiple shock absorption balls 20 are located. As shown in FIGS. 5 and 6, both maximum distances D are the distances between the center of gravity 400 and the horizontal plane where the geometric center of the shock absorption ball 20 at the upper left is located. Therefore, the distance d between the centroid 300 of the geometric shape 30 formed by the geometric centers of the multiple shock absorption balls 20 and the center of gravity 400 of the gimbal 100 is always smaller than the distance between the centroid 94 of the geometric shape formed by the plurality of shock absorption balls 92 and the center of gravity 93 of the gimbal 91 in the existing technology shown in FIG. 1. Therefore, a better vibration isolation and stabilization-enhancement can be achieved with the shock absorption balls 20.

In the example shown in FIG. 5, the plurality of shock absorption balls 20 are located above the horizontal plane where the center of gravity 400 of the gimbal 100 is located. In the example shown in FIG. 6, some shock absorption balls 20 are located above the horizontal plane where the center of gravity 400 of the gimbal 100 is located, and the other shock absorption balls 20 are located below the horizontal plane where center of gravity 400 of the gimbal 100 is located. Therefore, the oblique angle of the geometric plane formed by the geometric centers of the plurality of shock absorption balls 20 relative to the horizontal direction in the example shown in FIG. 5 is smaller than the oblique angle of the geometric plane formed by the geometric centers of the plurality of shock absorption balls 20 relative to the horizontal direction in the example shown in FIG. 6. However, in both situations, the centroid 300 of the geometric shape 30 formed by the geometric centers of the multiple shock absorption balls 20 can be close to the center of gravity 400 of the gimbal 100 or coincide with the center of gravity 400 of the gimbal 100. The closer the centroid 300 of the geometric shape 30 formed by the geometric centers of the plurality of shock absorption balls 20 is to the center of gravity 400 of the gimbal 100, the better the effect of shock absorption and stabilization can be.

Further, the distance d between the centroid 300 of the geometric shape 30 formed by the geometric centers of the plurality of shock absorption balls 20 and the center of gravity 400 of the gimbal 100 is within 20% of the distance between the geometric centers of the two shock absorption balls 20 that are farthest from each other among the plurality of shock absorption balls 20 (such two shock absorption balls 20 are also referred to as "two most separated shock absorption balls"). In some embodiments, the distance between the geometric centers of the two shock absorption balls 20 that are farthest from each other among the plurality of shock absorption balls 20 ranges from 0 to 250 mm, then the distance d between the centroid 300 of the geometric shape 30 formed by the geometric centers of the plurality of shock absorption balls 20 and the center of gravity 400 of the gimbal 100 ranges from 0 to 50 mm. In some embodiments, the centroid 300 of the geometric shape 30 formed by the geometric centers of the plurality of shock absorption balls 20 coincides with the center of gravity 400 of the gimbal 100, that is, the distance between the centroid 300 of the geometric shape 30 formed by the geometric centers of the plurality of shock absorption balls 20 and the center of gravity 400 of the gimbal 100 is zero. In this way, the vibration of the UAV in the translational direction will not cause the rotational vibration of the gimbal 100 around the center of gravity 400. Therefore, a coupled rotational vibration of the gimbal 100 caused the translational vibration of the UAV is eliminated and the vibration isolation effect of the shock absorption balls 20 is further improved.

In some embodiments, as shown in FIG. 6, some shock absorption balls 20 are located above the horizontal plane where the center of gravity 400 of the gimbal 100 is located, and the other shock absorption balls 20 are located below the horizontal plane where center of gravity 400 of the gimbal 100 is located. The distance between the centroid 300 of the geometric shape 30 formed by the geometric centers of the plurality of shock absorption balls 20 and the center of gravity 400 of the gimbal 100 becomes shorter, so that a better shock absorption and stabilization effect can be achieved.

Further, the connection assembly 10 includes a main body 110 arranged at the top of the support assembly 40, a first arm 120 extending forward from the main body 110 in a horizontal direction (the X direction in FIG. 3) and a second arm 130 extending downward from the main body 110 in a vertical direction (the Y direction in FIG. 3). Some of the shock absorption balls 20 are mounted at the first arm 120, and the other shock absorption balls 20 are mounted at the second arm 130 to ensure that some shock absorption balls 20 are located above the horizontal plane where the center of gravity 400 of the gimbal 100 is located, and the other shock absorption balls 20 are located below the horizontal plane where center of gravity 400 of the gimbal 100 is located. Optionally, the support assembly 40 includes a front portion and a rear portion along a horizontal direction. The main body 110 is at the rear portion of the support assembly 40, so that the first arm 120 is arranged at the top of the support assembly 40 and the second arm 130 is set at the rear portion of the support assembly 40. On the one hand, the connection between the connection assembly 10 and the support assembly is more stable. On the other hand, the first arm 120 and the second arm 130 can be closely fitted at the peripheral side of the support assembly 40, and the space of the support assembly 40 in the height direction is optimized. As a result, the gimbal 100 has a neat appearance and occupies less space.

Two arrangements of the shock absorption balls 20 and corresponding structures of the connection assembly 10 in the respective arrangements are described in connection with the drawings and embodiments. The arrangement of the shock absorption balls 20 and the structure of the connection assembly 10 are not limited to the example arrangements described below, but can be correspondingly modified according to actual needs, as long as the geometric plane formed by the geometric centers of the plurality of shock absorption balls 20 is located obliquely relative to the horizontal direction, so that the centroid 300 of the geometric shape 30 formed by the geometric centers of the multiple shock absorption balls 20 is close to the center of gravity 400 of the gimbal 100 or coincides with the center of gravity 400 of the gimbal 100.

FIGS. 2-4 schematically show an example arrangement of the shock absorption ball 20 and the corresponding structure of the connection assembly 10. The main body 110 is connected to the rear part of the support assembly 40 with a fastener 50 (a screw shown in FIG. 2). There is one first arm 120, which is formed by extending forward from the center position of the main body 110 in a horizontal direction (the X direction in FIG. 3). The first arm 120 is arranged at the top of the support assembly 40 as shown in FIG. 2. There are two second arms 130, which extend downward from two sides of the main body 110, respectively, in a vertical direction (the Y direction in FIG. 3). The two second arms 130 are arranged side by side at the rear portion of the support assembly 40. The number of the plurality of shock absorption balls 20 is at least three. At least one shock absorption ball 20 is mounted at the first arm 120, and at least one shock absorption ball 20 is mounted at each of the second arms 130.

That is, in this embodiment, the geometric shape 30 formed by the geometric centers of the plurality of shock absorption balls 20 is a triangular structure. In the examples shown in FIGS. 2-4, the number of shock absorption balls 20 is three. That is, one shock absorption ball 20 is mounted at the first arm 120, and the other two shock absorption balls 20 are mounted at the two second arms 130, respectively. However, the number of the shock absorption balls 30 can be increased according to actual needs, and is not limited to three. The shock absorption ball 20 mounted at the first arm 120 is located at the top corner of the triangular structure, and the two shock absorption balls 20 mounted at the two second arms 130 are respectively located at two bottom corners of the triangle structure. Optionally, in the example shown in FIG. 2, a slot 405 is formed on the top of the support assembly 40, and the first arm 120 may be embedded in the slot 405 to be flush with the surface of the support assembly 40 to achieve a neat appearance and save space.

Further, the two second arms 130 are symmetrical about a vertical center plane of the main body 110. The two shock absorption balls 20 mounted at the two second arms 130 are symmetrically arranged about the vertical center plane of the main body 110, so that the distances between the two shock absorption balls 20 mounted at the two second arms 130 and the shock absorption ball 20 mounted at the first arm 120 are same, and hence the geometric shape 30 formed by the geometric centers of the plurality of shock absorption balls 20 is an isosceles triangle (as shown in FIG. 4), which can ensure that the shock absorbing balls 20 are uniformly stressed to improve the stability of the connection between the gimbal 100 and the UAV. In some embodiments, as shown in FIG. 2, the two second arms 130 and the main body 110 are integrally formed. Both ends of the main body 110 protrude beyond the two second arms 130, respectively. The two second arms 130 and the main body 110 are integrally formed into a double T-shaped structure. The geometric shape 30 formed by the geometric centers of the multiple shock absorption balls 20 is an isosceles triangle, which can ensure that the shock absorption balls 20 are uniformly stressed, and avoid a drastic change in the magnitudes and directions of the forces applied to the shock absorption balls 20 during the maneuvering flight of the UAV. As a result, the shock absorption balls 20 meet the requirements of the rigidity and the linear phase of damping.

Figure 7:
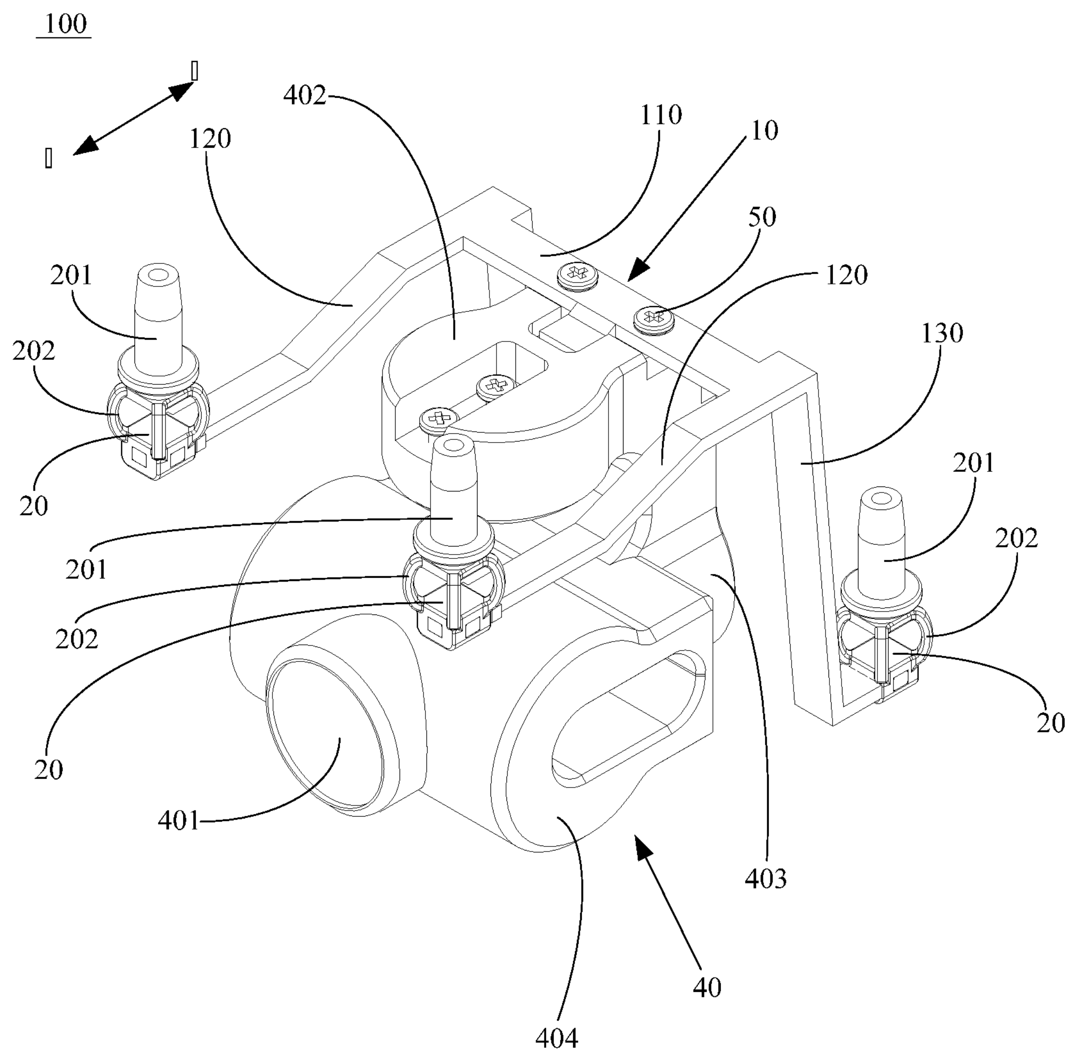
FIG. 7 is a schematic perspective view of another gimbal according to an embodiment of the disclosure.
Figure 8:
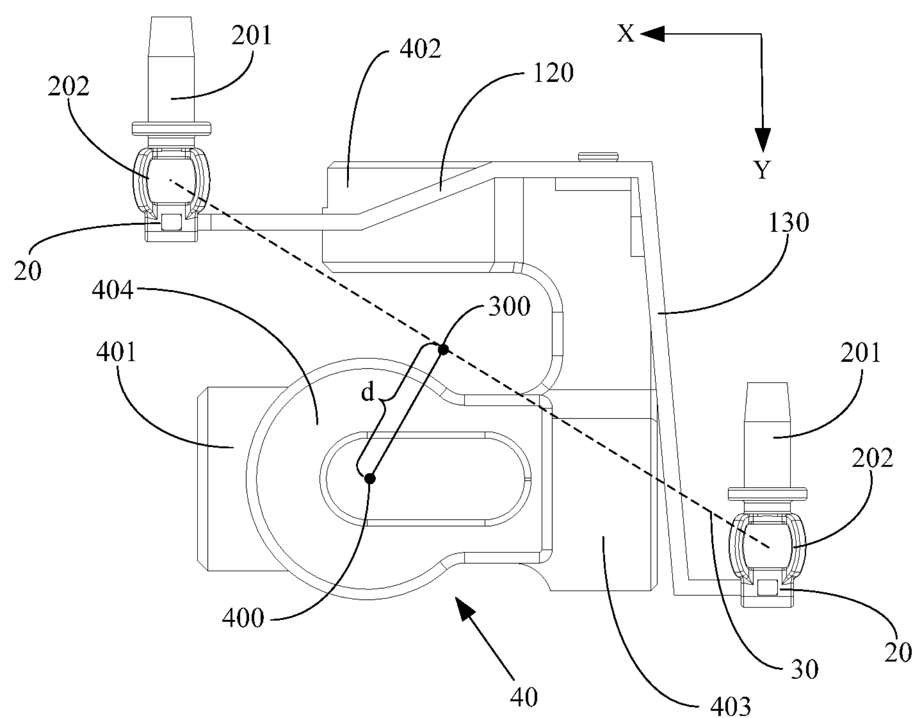
FIG. 8 is a side view of the gimbal shown in FIG. 7.
Figure 9:
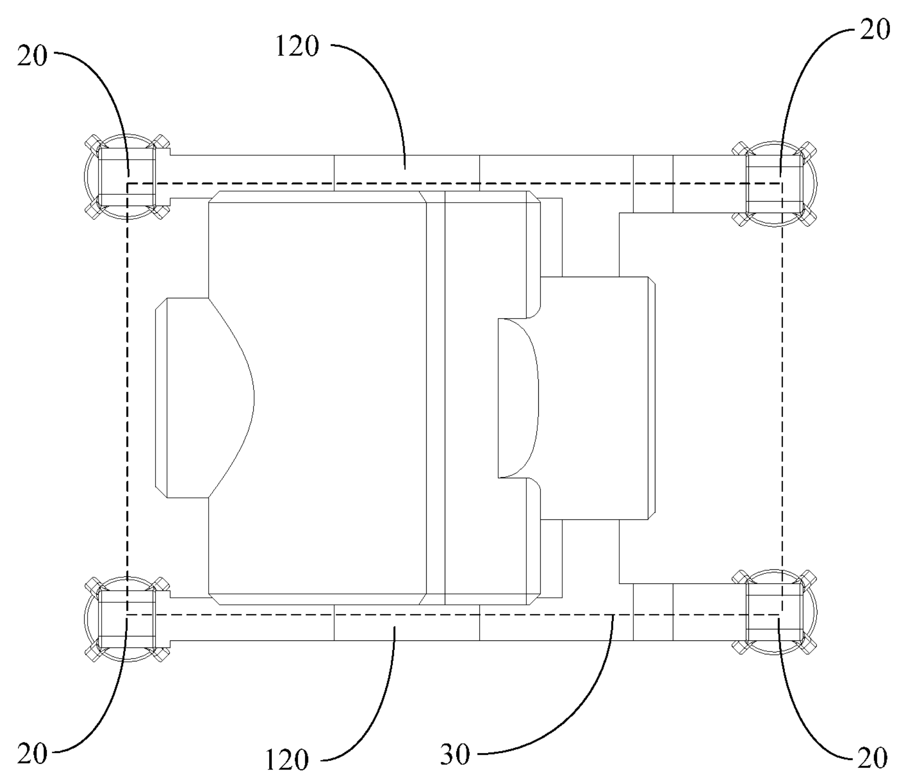
FIG. 9 is a top view of the gimbal shown in FIG. 7.

FIGS. 7-9 schematically show another example arrangement of the shock absorption ball 20 and the corresponding structure of the connection assembly 10. The main body 110 is connected to the rear part of the support assembly 40 with a fastener 50 (a screw shown in FIG. 7). There are two first arms 120, which extend forward from the two sides of the main body 110, respectively, in the horizontal direction (the X direction in FIG. 8). The two first arms shown in 7 are arranged at the top of the support assembly 40. There are two second arms 130, which extend downward from the two sides of the main body 110, respectively, in the vertical direction (the Y direction in FIG. 8). The two second arms shown in FIG. 7 are arranged side by side at the rear part of the support assembly 40. The number of the plurality of shock absorption balls 20 is at least four. At least one shock absorption ball 20 is mounted at each of the two first arms 120, and at least one shock absorption ball 20 is mounted at each of the two second arms 130.

That is, in some embodiments, the geometric shape 30 formed by the geometric centers of the plurality of shock absorption balls 20 is a quadrilateral structure. In the examples shown in FIGS. 7-9, the number of shock absorption balls 20 is four. One shock absorption ball 20 is mounted at each of the two first arm 120, and one shock absorption balls 20 is mounted at each of the two second arms 130. However, the number of shock absorption balls 30 can be increased according to actual needs, and is not limited to four. The four shock absorption ball 20 are mounted at four vertices of the quadrilateral structure.

Further, the two first arms 120 are symmetrical about the vertical center plane of the main body 110, and the two second arms 130 are symmetrical about the vertical center plane of the main body 110. The two shock absorption balls 20 mounted at the two first arms 120 are symmetrically arranged about the vertical center plane of the main body 110 and the two shock absorption balls 20 mounted at the two second arms 130 are symmetrically arranged about the vertical center plane of the main body 110, so that the distances between the shock absorption balls 20 mounted at the first arm 120 and the second arms 130 on the same side of the main body 110 are same. Therefore, the geometric shape 30 formed by the geometric centers of the plurality of shock absorption balls 20 is an axisymmetric quadrilateral structure, which can ensure that the shock absorbing balls 20 are uniformly stressed to improve the stability of the connection between the gimbal 100 and the UAV. In some embodiments, as shown in FIG. 9, the first arm 120 and the second arm 130 on the same side of the main body 110 are connected together, so that the geometric shape 30 formed by the geometric centers of the plurality of shock absorption balls 20 is a rectangular structure. In some embodiments, the first arm 120 and the second arm 130 located on the same side of the main body 110 are integrally formed. For example, as shown in FIG. 7, the first arm 120 and the second arm 130 located on the same side of the main body 110 are integrally formed into an L-shaped structure. The geometric shape 30 formed by the geometric centers of the multiple shock absorption balls 20 is an axisymmetric quadrilateral structure, which can ensure that the shock absorption balls 20 are uniformly stressed, and avoid a drastic change in the magnitudes and directions of the forces applied to the shock absorption balls 20 during the maneuvering flight of the UAV. As a result, the shock absorption balls 20 meet the requirements of the rigidity and the linear phase of damping.

Figure 10:
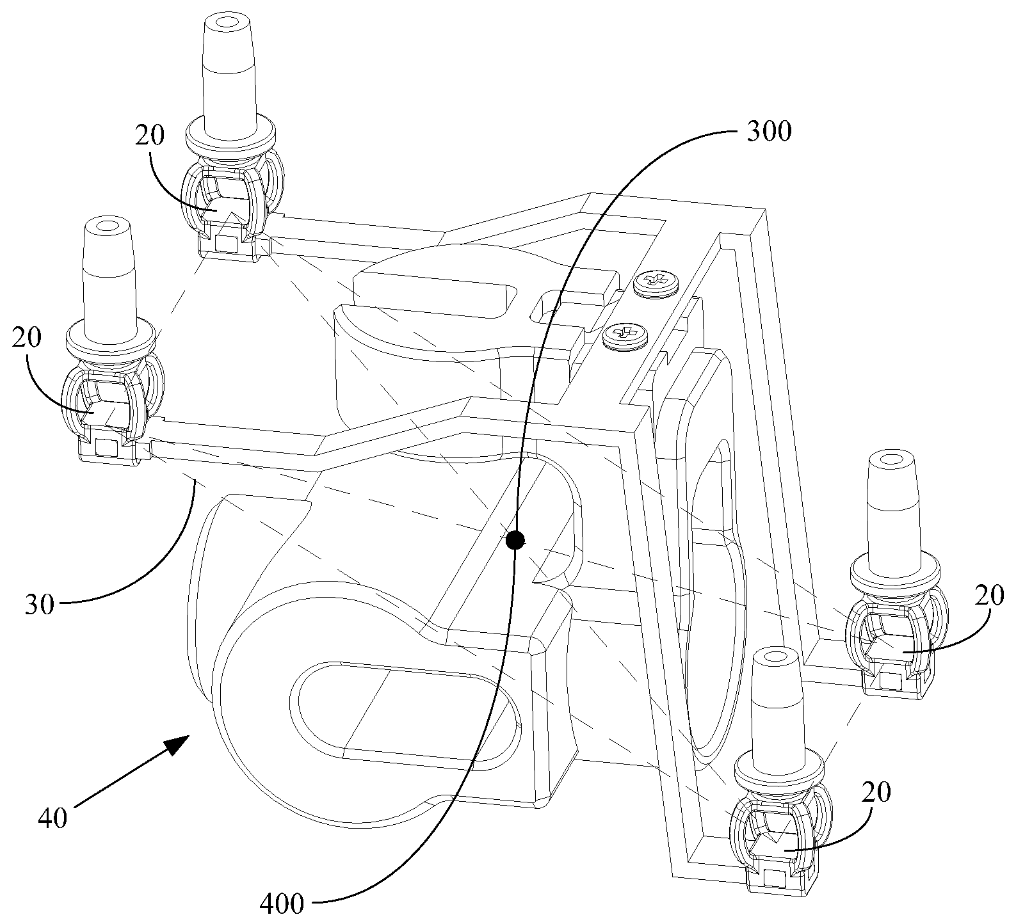
FIG. 10 is a schematic perspective view of another gimbal according to an embodiment of the disclosure.

As shown in FIG. 10, the geometric shape 30 formed by the geometric centers of multiple shock absorption balls 20 is a rectangle. The farthest distance between two shock absorption balls 20 among the plurality of shock absorption balls 20 is the diagonal distance of the rectangle. The centroid 300 of the rectangle coincides with the center of gravity 400 of the gimbal 100.

The geometric shape 30 formed by the geometric centers of the plurality of shock absorption balls 20 (that is, the arrangement manner of the shock absorption balls 20) may be another shape. The structure of the connection assembly 10 may be changed based on the geometric shape 30, as long as the geometric plane where the geometric centers of the plurality of shock absorption balls 20 are located is oblique relative to the horizontal direction, so that the centroid 300 of the geometric shape 30 formed by the geometric centers of the plurality of shock absorption balls 20 is close to center of gravity 400 of the gimbal 100 or coincides with the center of gravity 400 of the gimbal 100.

As shown in FIGS. 2 and 7, in some embodiments, the shock absorption ball 20 is provided with a fixing member 201, and the shock absorption ball 20 is connected to the UAV through the fixing member 201. The fixing member 201 is arranged in at least one of the horizontal direction (as shown in FIG. 2, the shock absorption ball can be considered to be a side-pull type), the vertical direction (as shown in FIG. 7, the shock absorption ball can be considered to be a down-press type), or an inclined direction relative to a horizontal direction (the shock absorption ball can be considered to be a diagonal-pull type). As shown in FIG. 2, the fixing member 201 of the shock absorption ball 20 at the second arm 130 has a "back-to-back dual F" shaped column structure, and the fixing member 201 of the shock absorption ball 20 at the first arm 120 has a trapezoidal shaped column structure. As shown in FIG. 7, the fixing member 201 has a column structure. The setting direction and structure of the fixing member 201 can be correspondingly changed according to the actual setting manner of the shock absorption ball 20 of the gimbal 100 and the body of the UAV, which are not limit in this disclosure. The shock absorption ball 20 is further provided with a buffer member 202, and the fixing member 201 may be arranged at the buffer member 202. The buffer member 202 plays a buffering role to absorb the shock between the shock absorption ball 20 and the vehicle body of the UAV.

In some embodiments, the gimbal 100 is a three-axis gimbal. The support assembly 40 of the gimbal 100 includes a yaw axis assembly 402 connected to the connection assembly 10, a roll axis assembly 403 movably connected to the yaw axis assembly 402, and a pitch axis assembly 404 movably connected to the roll axis assembly 403. The photographing device 401 is mounted at the pitch axis assembly 404. The shooting angle of the photographing device 401 can be adjusted through the cooperation of the yaw axis assembly 402, the roll axis assembly 403, and the pitch axis assembly 404.

In the gimbal 100 of this disclosure, the plurality of shock absorption balls 20 are arranged in a way that a geometric plane where the geometric centers of the multiple shock absorption balls 20 are located is oblique relative to a horizontal direction, so that the centroid 300 of the geometric shape 30 formed by the geometric centers of the multiple shock absorption balls 20 is close to the center of gravity 400 of the gimbal 100 or coincides with the center of gravity 400 of the gimbal 100. Therefore, the distance between the centroid 300 of the geometric shape 30 formed by the geometric centers of the multiple shock absorption balls 20 and the center of gravity 400 of the gimbal 100 is reduced. Accordingly, rotational vibrations of the gimbal 100 around the center of gravity 400 caused by the vibrations of the UAV in a translational direction are reduced and the vibration isolation effect of the shock absorption balls 20 is improved. Further, the shake of the gimbal 100 caused by the shake of the UAV can be reduced to avoid the collisions between the gimbal 100 and other structural members of the UAV, thereby improving the stabilization-enhancement control effect on the gimbal 100.

The present disclosure further provides a UAV, which includes a vehicle body and the gimbal 100. The vehicle body of the UAV is provided with a mounting assembly adapted to the connection assembly 10 of the gimbal 100. The connection assembly 10 is mounted at the mounting assembly, and the gimbal 100 is connected to the vehicle body of the UAV. Optionally, the UAV may be a multirotor UAV, such as a quadcopter. The description of the gimbal 100 in the above embodiments is also applicable to the UAV of the present disclosure.

In the UAV of this disclosure, the plurality of shock absorption balls 20 of the gimbal 100 are arranged in a way that a geometric plane where the geometric centers of the multiple shock absorption balls 20 are located is oblique relative to a horizontal direction, so that the centroid 300 of the geometric shape 30 formed by the geometric centers of the multiple shock absorption balls 20 is close to the center of gravity 400 of the gimbal 100 or coincides with the center of gravity 400 of the gimbal 100. Therefore, the distance between the centroid 300 of the geometric shape 30 formed by the geometric centers of the multiple shock absorption balls 20 and the center of gravity 400 of the gimbal 100 is reduced. Accordingly, rotational vibrations of the gimbal 100 around the center of gravity 400 caused by the vibrations of the UAV in a translational direction are reduced and the vibration isolation effect of the shock absorption balls 20 is improved. Further, the shake of the gimbal 100 caused by the shake of the UAV can be reduced to avoid the collisions between the gimbal 100 and other structural members of the UAV, thereby improving the stabilization-enhancement control effect on the gimbal 100.

In the present disclosure, relational terms such as first and second are only used to distinguish one entity or operation from another entity or operation, and do not necessarily require or imply that there is any such actual relationship or order between these entities or operations. The term "comprising," "including" or any other variation thereof is non-exclusive inclusion, such that a process, method, article, or device that include a series of elements include not only those elements but also other elements that are not explicitly listed, or elements that are inherent to such a process, method, article, or device. Without more restrictions, the elements defined by the sentence "including a . . . " do not exclude the existence of other identical elements in the process, method, article, or equipment that includes the elements.

The gimbal and the UAV provided by the present disclosure are described in detail above. Specific examples are used to explain the principles and implementation of the present disclosure. The descriptions of the above embodiments are only for facilitating the understanding of the present disclosure; meanwhile, for a person of ordinary skill in the art, according to the present disclosure, there will be changes in the specific implementation and application. In summary, the content of this specification is not a limitation to this disclosure.

What is claimed is:

1. A gimbal comprising:

a photographing device;

a support assembly carrying the photographing device;

a connection assembly connected to the support assembly; and a plurality of shock absorption balls mounted at the connection assembly and configured to connect the gimbal to a vehicle body of an unmanned aerial vehicle (UAV);

wherein a geometric plane where geometric centers of the plurality of shock absorption balls are located is oblique relative to a horizontal direction, wherein a distance between a centroid of a geometric shape formed by the geometric centers of the plurality of shock absorption balls and a center of gravity of the gimbal is smaller than a maximum distance, the maximum distance being a maximum one of distances between the center of gravity of the gimbal and horizontal planes where the geometric centers of the plurality of shock absorption balls are located.

2. The gimbal of claim 1, wherein the distance between the centroid of the geometric shape and the center of gravity of the gimbal is within 20% of a distance between the geometric centers of two most separated shock absorption balls that are farthest from each other among the plurality of shock absorption balls.

3. The gimbal of claim 2, wherein the distance between the geometric centers of the two most separated shock absorption balls ranges from 0 to 250 mm.

4. The gimbal of claim 1, wherein one or more of the plurality of shock absorption balls are located above a horizontal plane where a center of gravity of the gimbal is located, and another one or more of the plurality of shock absorption balls are located below the horizontal plane where the center of gravity of the gimbal is located.

5. The gimbal of claim 4, wherein:

the connection assembly includes:

a main body at a top of the support assembly;

a first arm extending forward from the main body in the horizontal direction; and a second arm extending downward from the main body in a vertical direction; and the one or more of the shock absorption balls are mounted at the first arm, and the other one or more of the shock absorption balls are mounted at the second arm.

6. The gimbal of claim 5, wherein:

the support assembly includes a front portion and a rear portion arranged along the horizontal direction; and the main body is at the rear portion of the support assembly.

7. The gimbal of claim 5, wherein:

the second arm is one of two second arms of the connection assembly extending downward from two sides of the main body, respectively, in the vertical direction;

the plurality of shock absorption balls include at least three shock absorption balls;

one of the at least three shock absorption balls is mounted at the first arm; and other two of the at least three shock absorption balls are mounted at the two second arms, respectively.

8. The gimbal of claim 7, wherein:

the two second arms are symmetrical about a vertical center plane of the main body; and the other two of the at least three shock absorption balls mounted at the two second arms are symmetrically arranged about the vertical center plane of the main body.

9. The gimbal of claim 5, wherein:

the first arm is one of two first arms of the connection assembly extending forward from two sides of the main body, respectively, in the horizontal direction;

the second arm is one of two second arms of the connection assembly extending downward from the two sides of the main body, respectively, in the vertical direction;

the plurality of shock absorption balls include at least four shock absorption balls;

two of the at least four shock absorption balls are mounted at the two first arms, respectively; and other two of the at least four shock absorption balls are mounted at the two second arms, respectively.

10. The gimbal of claim 9, wherein:

the two first arms are symmetrical about a vertical center plane of the main body;

the two second arms are symmetrical about the vertical center plane of the main body;

the two of the at least four shock absorption balls mounted at the two first arms are symmetrically arranged about the vertical center plane of the main body;

the other two of the at least four shock absorption balls mounted at the two second arms are symmetrically arranged about the vertical center plane of the main body; and the first arm and the second arm on a same side of the main body are connected together.

11. The gimbal of claim 1, wherein each of the shock absorption balls includes a fixing member and is connected to the vehicle body of the UAV through the fixing member.

12. The gimbal of claim 1, wherein:

the gimbal is a three-axis gimbal;

the support assembly of the gimbal includes:

a yaw axis assembly connected to the connection assembly; a roll axis assembly movably connected to the yaw axis assembly; and a pitch axis assembly movably connected to the roll axis assembly; and the photographing device is mounted at the pitch axis assembly.

13. An unmanned aerial vehicle (UAV) comprising:

a vehicle body; and a gimbal connected to the vehicle body, the gimbal including:

a photographing device;

a support assembly carrying the photographing device;

a connection assembly connected to the support assembly; and a plurality of shock absorption balls mounted at the connection assembly and connecting the gimbal to the vehicle body;

wherein:

a geometric plane where geometric centers of the plurality of shock absorption balls are located is oblique relative to a horizontal direction;

the vehicle body includes a mounting assembly; and
the connection assembly is mounted at the mounting assembly,
wherein a distance between a centroid of a geometric shape formed by the geometric centers of the plurality of shock absorption balls and a center of gravity of the gimbal is smaller than a maximum distance, the maximum distance being a maximum one of distances between the center of gravity of the gimbal and horizontal planes where the geometric centers of the plurality of shock absorption balls are located.

14. The UAV of claim 13, wherein the distance between the centroid of the geometric shape and the center of gravity of the gimbal is within 20% of a distance between the geometric centers of two most separated shock absorption balls that are farthest from each other among the plurality of shock absorption balls.

15. The UAV of claim 14, wherein the distance between the geometric centers of the two most separated shock absorption balls ranges from 0 to 250 mm.

16. The UAV of claim 13, wherein one or more of the plurality of shock absorption balls are located above a horizontal plane where a center of gravity of the gimbal is located, and another one or more of the plurality of shock absorption balls are located below the horizontal plane where the center of gravity of the gimbal is located.

17. The UAV of claim 16, wherein:
the connection assembly includes:
a main body at a top of the support assembly;
a first arm extending forward from the main body in the horizontal direction; and
a second arm extending downward from the main body in a vertical direction; and
the one or more of the shock absorption balls are mounted at the first arm, and the other one or more of the shock absorption balls are mounted at the second arm.

18. The UAV of claim 17, wherein:
the support assembly includes a front portion and a rear portion arranged along the horizontal direction; and
the main body is at the rear portion of the support assembly.

19. A gimbal, comprising:
a photographing device;
a support assembly carrying the photographing device;
a connection assembly connected to the support assembly; and
a plurality of shock absorption balls mounted at the connection assembly and configured to connect the gimbal to a vehicle body of an unmanned aerial vehicle (UAV);
wherein a geometric plane where geometric centers of the plurality of shock absorption balls are located is oblique relative to a horizontal direction, and
wherein one or more of the plurality of shock absorption balls are located above a horizontal plane where a center of gravity of the gimbal is located, and another one or more of the plurality of shock absorption balls are located below the horizontal plane where the center of gravity of the gimbal is located.

* * * * *